(12) United States Patent
Dennis

(10) Patent No.: US 6,542,733 B1
(45) Date of Patent: Apr. 1, 2003

(54) SYSTEM AND METHOD FOR CONTROLLING PERSONAL TELEPHONE NUMBER DIALING LISTS AND DIALING CAPABILITIES

(76) Inventor: Charles L. Dennis, 20804 NE. 141st St., Woodinville, WA (US) 98072

(*) Notice: Subject to any disclaimer, the term of this patent is extended or adjusted under 35 U.S.C. 154(b) by 0 days.

(21) Appl. No.: 09/173,145

(22) Filed: Oct. 15, 1998

(51) Int. Cl.[7] ............................................. H04M 3/42
(52) U.S. Cl. ........................ 455/414; 455/433; 455/445
(58) Field of Search ................................ 455/460, 564, 455/565, 566, 569, 414, 432, 433, 445; 379/216

(56) References Cited

U.S. PATENT DOCUMENTS

| | | | |
|---|---|---|---|
| 5,161,184 A | 11/1992 | Smith et al. | 379/413 |
| 5,504,804 A | 4/1996 | Widmark et al. | 379/63 |
| 5,758,286 A | 5/1998 | Leppänen | 455/445 |
| 5,956,637 A * | 9/1999 | Ericsson | 455/414 |
| 5,963,875 A * | 10/1999 | Go | 455/564 |
| 5,974,133 A * | 10/1999 | Fleischer | 379/230 |
| 6,064,874 A * | 3/2000 | Cox | 455/404 |
| 6,064,878 A * | 5/2000 | Denker | 455/415 |
| 6,091,808 A * | 7/2000 | Wood | 379/201 |
| 6,148,211 A * | 11/2000 | Reed | 455/456 |
| 6,256,503 B1 * | 7/2001 | Stephens | 455/456 |
| 6,269,155 B1 * | 7/2001 | Dennert | 379/112 |

FOREIGN PATENT DOCUMENTS

| | | | |
|---|---|---|---|
| DE | 19632354 | 2/1998 | H04M/3/44 |
| WO | 9733439 | 9/1997 | H04Q/3/00 |
| WO | 9741654 | 11/1997 | H04H/1/00 |
| WO | 9747121 | 12/1997 | H04M/3/42 |
| WO | 9800987 | 1/1998 | H04Q/7/22 |

OTHER PUBLICATIONS

International Search Report, PCT/US99/21080.

* cited by examiner

Primary Examiner—Daniel Hunter
Assistant Examiner—Nick Corsaro

(57) ABSTRACT

A system and method are disclosed for providing personal dialing profiles for users of wireless devices. The users enter telephone numbers into a profile list and specify any desired special handling or routing operations for future calls to each number. The personal profile lists allow users to dial only an abbreviated portion of the telephone number and then the wireless network adds any other required digits, such as country, area or local exchange codes. The system also provides specified routing, such as using a preselected service provider when a call to a particular number will be a long distance call. The personal profile information is stored on an service control point (SCP) or a database that is accessible to the wireless telephone network. Users add telephone numbers and configure profile information using a personal computer, which is linked to the wireless network or SCP via a data network, such as the Internet.

28 Claims, 2 Drawing Sheets

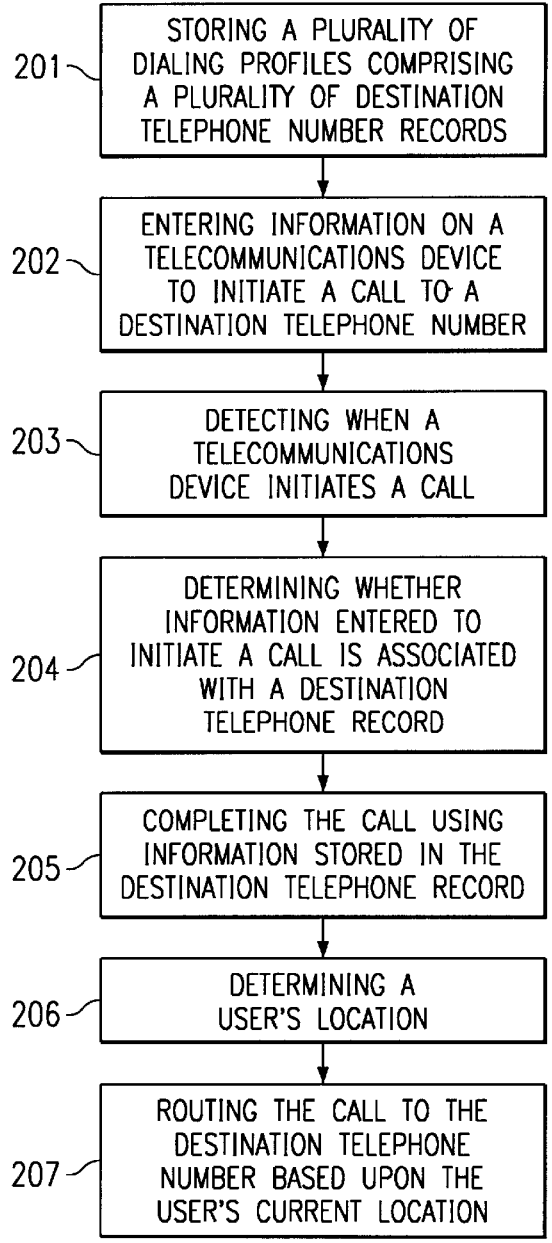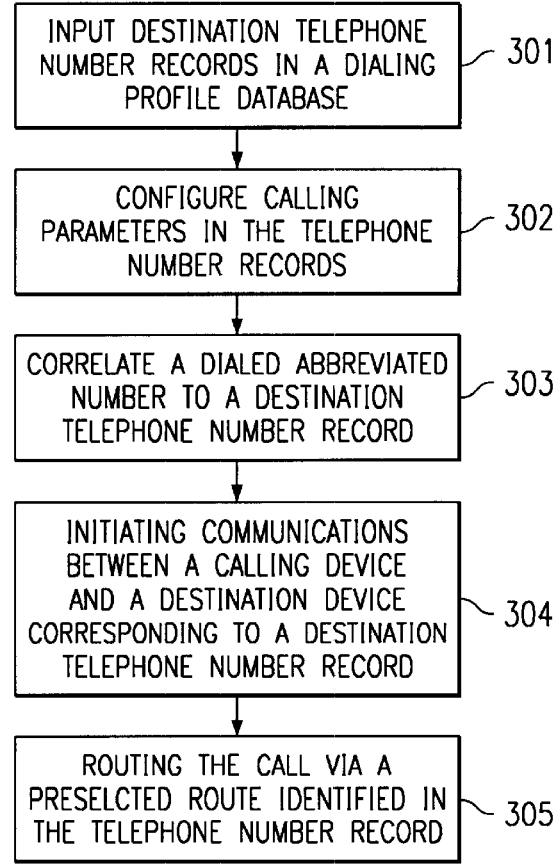

SYSTEM AND METHOD FOR CONTROLLING PERSONAL TELEPHONE NUMBER DIALING LISTS AND DIALING CAPABILITIES

TECHNICAL FIELD OF THE INVENTION

The present invention relates to wireless communications systems and, more particularly, to dialing services and a system and method for users of wireless devices to configure personal dialing profiles.

BACKGROUND OF THE INVENTION

Dialing a telephone number can be complicated due to the need to enter additional routing codes and service provider access or billing codes. Many cities have been assigned new area codes so that calls within one metropolitan area often require a caller to dial ten digits instead of seven. Also, service providers offering special long distance or calling card services typically require callers to dial a special routing number in order to access a particular telecommunications application. As a result, callers must memorize or keep a list of many telephone numbers or special routing codes.

This situation is especially difficult for mobile telephone or wireless device users who may not be able to easily look up a telephone number, area code, routing code or service access number when they are driving or away from their home or office. Most mobile telephones or wireless devices provide the user with at least a few memory locations capable of storing frequently called telephone numbers. However, depending on where the call is originated, the stored number may not include all of the required digits. For example, if the user travels away from their home location, in order to place a call to a number within the home area code, he or she may need to add the area code or a long distance access code to the called party's seven digit telephone number.

Some devices allow callers to maintain a speed call list in which a one or two digit code corresponds to a particular stored telephone number. However, managing such calling lists can be difficult because the user must keep track of which speed dial codes correspond to which called party. Furthermore, speed dial lists do not account for changes in the caller's location, so the user must use multiple memory locations for each stored number if the user wants to be able to use the speed dial function under varying conditions. For example, one location would hold the seven digit telephone number, another location would hold the telephone number plus area code for calls outside the area, and yet another location may hold a long distance access code in addition to the ten digit telephone number.

Adding numbers to frequently dialed lists can be cumbersome. Users often forget the correct programming sequence to enter new numbers. Also, inputting alphanumeric characters for names or other identifiers using the twelve button numeric keypad often requires the user to make multiple key presses for each character. As a result, users often fail to update their stored calling lists. Many mobile telephone and wireless device users lose interest in the capabilities offered by service providers due to difficulty of use.

SUMMARY OF THE INVENTION

These and other objects, features and advantages of the invention are embodied in the present invention which allows callers to dial an abbreviation of the number for the called destination rather than requiring the user to enter the full destination telephone number and any required routing and/or billing codes for each call. As long as the called party's telephone number is in the caller's list of personal numbers, as described below, the claimed invention identifies the correct destination telephone number from the dialed abbreviation. The system then modifies the telephone number as required to complete the call. The destination telephone number is modified based upon the caller and called party's locations and any special routing instructions specified by the caller.

The Personal Dialing Service described herein is more flexible than the prior art private branch exchange (PBX) closed user group dialing services that have been used by business customers. Typically, PBX systems allow users to dial the last four digits of a destination telephone number if the called party is also served by the same PBX. Instead of requiring a full seven or ten digit telephone number, the prior art PBX systems allow callers to drop the NPA-NXX portions of the dialed number. PBX systems provide abbreviated dialing by assuming that any dialed number is directed to another station served by the PBX. In order to access numbers outside of the PBX, callers must enter a special code, such as a "9," before dialing a non-PBX number. The special code alerts the PBX to route the number to a switch external from the PBX. Failure to dial the special code before dialing the outside number usually causes an error condition because the PBX will not recognize the NPA-NXX digits as a local extension.

The present invention expands the prior art wireline PBX capabilities and makes abbreviated dialing available to individual wireless customers. Additionally, the Personal Dialing Service described herein provides additional capabilities to the customers, such as automated routing and billing functionality.

It is a feature of the present invention to provide a system which enables a wireless subscriber with the capability to establish and maintain a list of frequently dialed numbers. Preferably, the user can access the system via an Internet based interface.

It is another feature of the invention to allow subscribers to add additional telephone numbers to the list of frequently called numbers by entering a special dialing sequence when dialing the number. For example, the user may enter a special key, such as the pound (#) or star (*) key, before and/or after the number to be added to the dialing list (e.g. #999-555-1234#).

It is a further feature to provide a system in which subscribers can dial an abbreviated version of the desired called number (e.g. 1234#) regardless of where the subscriber is currently located. Assuming that the subscriber's wireless service provider had a roaming agreement in the roamed market, the subscriber merely dials the abbreviated number and the personal dialing system appends or prepends any required digits to complete the call. The additional digits may include country codes, area codes, local exchange codes, or other routing and billing information.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which:

FIG. 2 is a flowchart illustrating the steps followed in one embodiment of the present invention; and FIG. 3 is a flowchart illustrating the steps followed in another embodiment of the present invention.

DESCRIPTION OF THE PREFERRED EMBODIMENTS

Figure 1:
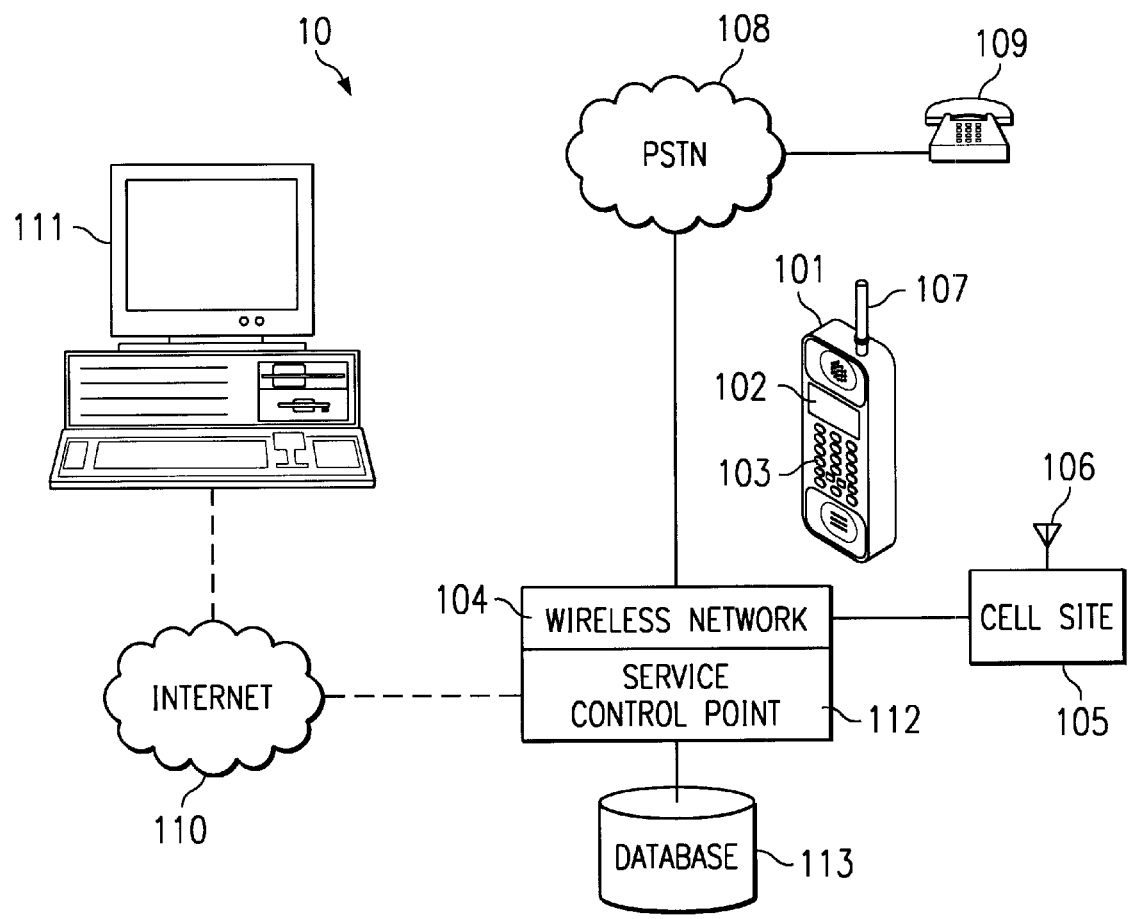
FIG. 1 is a block diagram of a system incorporating the present invention.

FIG. 1 is a block diagram of system 10, which illustrates the components of the present invention. A subscriber using a wireless device 101, such as a wireless telephone, communicates with wireless network 104. Wireless device 104 has keypad 103, which allows the user to enter telephone numbers or other information, and display 102, which can be used to display information, such as menu items. Wireless device 101 communicates with wireless network 104 through cell site 105 via antennas 106 and 107. Typically, a wireless network has a number of cell sites 105, each serving a specific geographic area. Wireless network 104 can determine the general location of device 101 by identifying which cell site 105 is communicating with device 101. The accuracy with which network 104 determines the user's location depends upon the size of the area served by cell site 105 and the capability of antenna 106 to determine which sector the subscriber is in. However, for the present invention, in order to determine the required routing information, all that is typically required to be known is the area code and service provider of cell site 105.

A user initiates a call by entering a telephone number on keypad 103. The call is routed to the destination telephone number through cell site 105 and wireless network 104. If the called destination is another wireless device, then wireless network 104 may complete the call via cell site 105, or some other cell site (not shown) which is part of wireless network 104. On the other hand, if the destination number is part of a wireline network, or served by a different wireless network (not shown), then wireless network 104 routes the call to public switched telephone network (PSTN) 108 and on to the appropriate switch or end office that serves called party 109.

In the example illustrated in FIG. 1, called destination 109 is assigned a specific telephone number using the well known NPA-NXX-XXXX format. In order to initiate a call between device 101 and called party 109, the user may have to enter all or part of the called party's NPA-NXX-XXXX number and may also have to enter additional routing or service access codes. The actual dialed number depends upon the location of caller 101 with respect to called party 109. If the caller 101 and called party 109 are within the same area code, then only the NXX-XXXX portion of the telephone number may need to be dialed. However, the entire number may need to be dialed if caller 101 is roaming outside of a home wireless service area having a different area code than the called party 109.

If caller 101 desires to use optional telecommunications services or special call routing, then additional numbers may have to be dialed before the NPA-NXX-XXXX number. For example, if caller 101 wants to use a particular long distance service provider of a certain call, then he/she must first dial routing codes, such as a "10XXX" or "1-800" number used by the long distance service provider. Caller 101 may also need to enter access or billing codes for the selected long distance service, such as an account number or personal identification number (PIN), in order to use the service.

In the present invention, as long as the destination number is contained within a list of preselected personal numbers, caller 101 need only dial an abbreviation of the desired number in order to initiate a call. Upon dialing the abbreviated number (e.g., last four digits), wireless network 104 determines, based on where the subscriber is currently located, the required NPA-NXX-XXXX dialing sequence and completes the call to called party 109. For example, if a wireless subscriber has a home location in Seattle, and roams to wireless system 104 in New York, network 104 knows where the caller is by identifying a particular cell 105 that is in communication with caller 101. Therefore, when caller 101 dials an abbreviated destination number, such as NXX-XXXX or just XXXX, network 104, recognizing that caller 101 is in New York, completes the call by adding the necessary digits to generate the correct dialing sequence.

The present invention can also be used to complete international calls. When the abbreviated number of called party 109 is dialed, network 104, knowing who the subscriber or caller is, who he/she is trying to call, and where he/she is currently located, adds the required country, area, and routing codes to complete the call. The personal profile system can be configured so that the user can select which portion of the destination telephone number is to be used for abbreviated dialing. Alternatively, the user can select to have a default setting, such as using the last four digits of each stored number, or the user could assign special codes, such as "*01", to certain frequently dialed numbers. SCP 112 or database 113 would then correlate the selected abbreviation to the desired called telephone number.

Users have the capability to identify particular services that are to be used for certain types of calls. In one embodiment, the user can select particular long distance service providers that are to be used for calls to certain numbers. This feature allows users to configure the personal dialing program to add routing information for calls to selected areas or at certain times. For example, wireless network 104 first determines what information must be added to complete the call, such as country or area codes, then network determines whether the call should routed to a preselected service provider, such as a particular long distance service provider. The user can configure the system so that certain criteria, such as time of day or calling location, will result in special routing for a call.

In a preferred embodiment, the personal dialing system is coupled to a public, globally accessible computer network, such as Internet 110. Users access and configure their personal profile information using personal computer (PC) 111. Personal profile information is stored at service control point (SCP) 112 or database 113. SCP 112 may be part of wireless network 14, as shown, or, alternatively, it 112 may be part of another network that can be accessed by network 104 in order to retrieve the personal profile information. Using PC 111, subscribers can add or edit telephone numbers and select specific telecommunications services for each number. Computer 111 may use a proprietary software program that is specifically developed to communicate with SCP 112 and to configure the personal dialing profiles. Alternatively, users may configure their personal profiles by accessing a public interface or gateway, such as a web site accessed using Internet 110. A publicly accessible configuration interface would provide the use of special access codes or PINs for security purposes. A system and method for configuring the features and capabilities of telecommunications devices is disclosed in application Ser. No. 08/996,524, entitled SYSTEM AND METHOD FOR CONTROLLING PERSONAL INFORMATION AND INFORMATION DELIVERY TO AND FROM A TELECOMMUNICATIONS DEVICE, filed Dec. 23, 1997, the disclosure of which is hereby incorporated by reference herein.

PC 111 presents the user with a graphical user interface (GUI) display which allows the user to configure the personal profile information by adding, deleting, and editing names, telephone numbers, long distance calling card numbers, etc. The personal profile system coordinates with the service administration management system of wireless network 104 to maintain the data in SCP 112.

Subscribers can also automatically add numbers to their personal profile calling list when they dial a telephone number on wireless device 101. In one embodiment, this is accomplished by entering a certain pre-established code, such as by pressing the pound (#) or star (*) key, in conjunction with the dialed number (e.g. #999-555-1234#). The number will then be automatically stored in the user's personal profile on SCP 112. In another embodiment, all new numbers that are dialed are stored in SCP 112 or database 113, and when the user next accesses the personal profile configuration program on PC 111, he/she is prompted to add the new numbers to the user's personal profile list.

The user can also add the telephone number for incoming callers to the personal profile list using Automatic Number Identification (ANI) or Caller Identification (CID) information. For each incoming call, network 104 could send the ANI or CID information to SCP 112, where it would be temporarily stored until the user next accessed the configuration program. Then the user would be prompted to add the new number to the user's profile. Also, a name or other identification for the newly entered number could be of the could be added automatically via the ANI or CID capability. Alternatively, the subscriber could add the name and other information the next time he or she was logged on to the personal profile management site using PC 111. Once the number is added using wireless device 101, the subscriber can dial an abbreviation of the number, for example "1234", and the call will be completed by wireless network 14, which will add the required digits, such as by prepending "999-555" to the dialed "1234" number.

Another method for adding additional names and numbers would be through a normal customer care center contact where a wireless service provider's customer representative could receive the information verbally from the customer and then add it to the user's profile through the customer representative's system.

Although the personal dialing profile system described herein is part of a wireless network, it will be understood that the invention is adaptable to use with a wireline telephone network. SCP 112 and database 113 can be part of a wireline network or can be accessed through PSTN 108 and network 104. Service providers can allow users to configure personal dialing numbers for their home or business telephones. The wireline dialing profiles can be configured in the same manner as described above, using a PC or an Internet web site. Telephone numbers can also be added as described above by requiring the caller to dial special codes, such as pound key, as part of the number to be added to the personal dialing profile. Alternatively, all of the numbers dialed can be temporarily added for later selection. Incoming callers' telephone numbers can also be added using ANI or CID information.

Like the wireless system, such a wireline system would permit callers to dial abbreviated destination telephone numbers without requiring the caller to specially configure the telephone's own memory or speed dialing functions. Either a wireless or wireline personal dialing application could be configured as a software application that runs on a telecommunications network.

Flowchart 200 in FIG. 2 shows the steps that are followed in one illustrative example of a system incorporating the present invention. In step 201, users store a plurality of destination telephone number records in dialing profiles. Each user may have one or more dialing profiles and each profile may correspond to one or more telecommunications devices. The user initiates a call in step 202 by entering information, such as a destination telephone number or a corresponding abbreviated code, on a telecommunications device. The telecommunications network detects when the device has initiated a call in step 203 and, in step 204, determines whether the information corresponds to a stored destination telephone record.

In step 205, the network uses information stored in the destination telephone number record to complete the call to the destination device. The call routing between the caller and destination device may depend upon factors such as time of day or caller location. In step 206, the network determines the user's current location, such as by identifying a particular cell or sector that is in communication with the user. The user location information is used in step 207 to route the call to the destination device. For example, the network may select special routing codes or access codes to be appended to the destination telephone number based upon the user's current location.

Flowchart 300 in FIG. 3 illustrates the operation of another illustrative example of a system employing the present invention. In step 301, destination telephone number records are input into a dialing profile database. The database may be part of a telecommunications network, such as an SCP. The database is used by the telecommunications network to route calls between the users' telecommunication devices and called destinations. Users access the database in step 302 to configure the parameters of the telephone number records. The users may access the database via a menu displayed on the telecommunications device, or via a computer connection, such as an Internet web site. The users may select certain calling features that are to be used to route calls to particular destination telephone numbers. The routing features may be used for each call or they may be used depending upon the caller's location or the time of day. A user may also configure a destination telephone number record so that an abbreviated number or a code can be entered in order to initiate a call to the called destination. When a call is initiated in step 303, the system correlates the abbreviated number to a particular record. Then, in step 304, the system initiates communications between the user and the called destination. In step 305, the system determines whether there is a preselected call route, such as a particular long distance carrier, that should be used for the communication. The preferred routing is then used by the telecommunications network to complete the call to the called destination.

Although the present invention and its advantages have been described in detail, it should be understood that various changes, substitutions and alterations can be made herein without departing from the spirit and scope of the invention as defined by the appended claims.

What is claimed is:

1. A system for providing enhanced dialing features to individual wireless devices the wireless devices capable of roaming such that the wireless devices may communicate with each of a plurality of wireless networks depending upon a wireless device's current geographical location, comprising:

means for storing a plurality of unique dialing profiles, each of said profiles corresponding to a particular wireless device and wherein said profiles are not uniform throughout the system, said profiles comprising call completion information for a plurality of destination telephone numbers;

means for detecting when a call has been initiated by one of said wireless devices;

means for determining a current geographical location of the wireless device that has initiated a call;

means for correlating said wireless device to its corresponding unique dialing profile;

means for selecting a telecommunications carrier from one or more telecommunications carriers that are identified in said corresponding dialing profile, wherein said telecommunications carrier is selected based upon said current geographical location of the wireless device and a geographical location of a called party;

means for affixing routing information to call completion information that has been entered on said wireless device, wherein said routing information routes the call across a selected telecommunications carrier's network; and means for completing said initiated call using said call completion information and said routing information.

2. The system of claim 1 wherein said storing means comprises a service control point (SCP) in a telecommunications network.

3. The system of claim 1 wherein said storing means comprises a database coupled to a telecommunication network.

4. The system of claim 1 wherein said dialing profiles comprise:

a list of abbreviated dialing numbers corresponding to said destination telephone numbers, wherein said destination telephone numbers include routing data for each of said abbreviated dialing numbers.

5. The system of claim 1 wherein said routing information identifies an area code.

6. The system of claim 1 wherein said routing information identifies a telecommunications carrier.

7. The system of claim 1 further comprising:

means for configuring said dialing profiles.

8. The system of claim 9 wherein said configuring means comprises:

means for accessing said storing means via a computer network.

9. The system of claim 7 wherein said configuring means comprises:

means for adding said destination telephone numbers via said wireless device.

10. The system of claim 9, wherein said destination telephone numbers are updated automatically each time a user enters a new destination telephone number on said wireless device.

11. A method for providing personal dialing services to a wireless device, the wireless device being capable of roaming such that the wireless device may communicate with each of a plurality of wireless networks depending upon the wireless device's current geographical location, comprising the steps of:

storing a plurality of unique dialing profiles, each of said dialing profiles corresponding to a particular wireless device and wherein said profiles are not uniform throughout the system, the dialing profile comprising a plurality of destination telephone number records;

detecting when the wireless device initiates a call;

determining a current geographical location of the wireless device that has initiated a call;

determining whether information entered to initiate said call is associated with one of said destination telephone number records in the corresponding unique dialing profile;

selecting a telecommunications carrier from one or more telecommunications carriers that are identified in said corresponding dialing profile, wherein said telecommunications carrier is selected based upon the current geographical location of the wireless device and a geographical location of a called party;

affixing routing information to call completion information that has been entered on said wireless device, wherein said routing information routes the call across a selected telecommunications carrier's network; and completing said initiated call using the call completion information and the routing information.

12. The method of claim 11 further comprising the step of: allowing users to configure said stored dialing profiles.

13. The method of claim 12 wherein said users access a stored dialing profile database via a computer network.

14. The method of claim 12 wherein said users specify routing information for said dialing profiles.

15. The method of claim 12 wherein said users specify abbreviated dialing codes for said destination telephone records.

16. The method of claim 11 wherein said dialing profiles are stored on a service control point of a telecommunications network.

17. The method of claim 11 wherein said completing step comprises the step of:

adding routing codes to an abbreviated telephone number entered by a user.

18. The method of claim 17 wherein said routing codes are selected from the group consisting of:

country codes;

area codes; and local exchange codes.

19. The method of claim 11 further comprising the step of:

determining said user's location by identifying a particular wireless network cell site that is in communication with said wireless device.

20. A method for using personal dialing services with a wireless device, the wireless device being capable of roaming such that the wireless device may communicate with each of a plurality of wireless networks depending upon the wireless device's current geographical location, comprising the steps of:

entering an abbreviated destination telephone number on a telecommunications device, wherein said abbreviated telephone number corresponds to a destination telephone number in a personal profile;

transmitting said abbreviated destination telephone number to a database that is coupled to a telecommunications network, said database having stored therein one or more personal profiles;

correlating the wireless device to a unique personal profile that is associated with the wireless device, wherein the unique personal profile is not a uniform profile that is used by more than one wireless device;

correlating the abbreviated destination telephone number to a destination telephone number stored in the unique personal profile, wherein the personal profile further comprises routing information for the destination telephone number; and completing a call under control of said telecommunications network from said telecommunications device in accordance with the routing information in said personal profile.

21. The method of claim 20 further comprising the steps of:

adding destination telephone numbers to said personal profile; and configuring said personal profile.

22. The method of claim 21 wherein a user adds said destination telephone numbers by entering a preselected code when dialing a telephone number.

23. The method of claim 21 wherein dialed telephone numbers are automatically added to said personal profile.

24. The method of claim 21 wherein users configure said personal profile via a personal computer that is coupled to said telecommunication database via a computer network.

25. The method of claim 21 wherein users add telephone numbers to said personal profile and configure said personal profile via said telecommunications device.

26. A computer program product having a computer readable medium with computer program logic recorded thereon for use in a system for providing personal dialing services to a wireless device in a telecommunications network, wherein the wireless device is capable of communicating with each of a plurality wireless network depending upon a current location of the wireless device, the computer program product comprising:

means for correlating a dialed abbreviated number to a unique destination telephone number record, said record comprising a complete destination telephone number and preselected routing information for said destination telephone number, and wherein said record is not a uniform dialing profile that is used by more than one wireless device;

means for determining a current geographical location of a wireless device that has initiated a call, wherein the wireless device is associated with the unique destination telephone number record;

means for selecting a telecommunications service provider from a list of said service providers in said associated destination telephone number record, wherein said service provider is selected based upon the current geographical location of the wireless device that has initiated the call and the geographical location of the destination telephone number;

means for affixing preselected routing information to said destination telephone number, wherein said preselected routing information ensures that the call is routed across the selected service provider's telecommunications network; and means for initiating communications between a calling telecommunications device and a destination telecommunications device utilizing said destination telephone number and said routing information.

27. The computer program product of claim 26 further comprising:

means for storing one or more dialing profiles, wherein said profiles comprising a plurality of destination telephone number records; and means for configuring said stored dialing profiles.

28. The computer program product of claim 26 further comprising:

means for routing a call from a telecommunications device to a called destination over a desired telecommunications route using information stored in said destination telephone number record.

* * * * *

UNITED STATES PATENT AND TRADEMARK OFFICE
CERTIFICATE OF CORRECTION

PATENT NO. : 6,542,733 B1 Page 1 of 1
DATED : April 1, 2003
INVENTOR(S) : Charles L. Dennis It is certified that error appears in the above-identified patent and that said Letters Patent is hereby corrected as shown below:

<u>Title page,</u>
Insert Item -- [73] Assignee: Openwave Systems Inc.
Redwood City, California --

Insert Item -- [74] *Attorney, Agent, or Firm*—Fulbright & Jaworski L.L.P. --

Signed and Sealed this

Twenty-eighth Day of October, 2003

JAMES E. ROGAN
*Director of the United States Patent and Trademark Office*